United States Patent
Misra et al.

(10) Patent No.: US 10,473,496 B2
(45) Date of Patent: Nov. 12, 2019

(54) DEVICES, SYSTEMS AND METHODS FOR MEASURING FLOW

(71) Applicants: Manjit Misra, Ames, IA (US); Yuh-Yuan Shyy, Ames, IA (US)

(72) Inventors: Manjit Misra, Ames, IA (US); Yuh-Yuan Shyy, Ames, IA (US)

(73) Assignee: M&S Flomatics Incorporated, Ames, IA (US)

( * ) Notice: Subject to any disclaimer, the term of this patent is extended or adjusted under 35 U.S.C. 154(b) by 0 days.

(21) Appl. No.: 15/700,967

(22) Filed: Sep. 11, 2017

(65) Prior Publication Data

US 2018/0094955 A1  Apr. 5, 2018

Related U.S. Application Data

(60) Provisional application No. 62/385,534, filed on Sep. 9, 2016.

(51) Int. Cl.
*G01F 1/30* (2006.01)

(52) U.S. Cl.
CPC ..................................... *G01F 1/30* (2013.01)

(58) Field of Classification Search
CPC .................. G01F 1/30; G01F 1/20; G01F 3/12
See application file for complete search history.

(56) References Cited

U.S. PATENT DOCUMENTS

| | | | |
|---|---|---|---|
| 2,941,401 A | 6/1960 | Streeter | |
| 3,056,293 A | 10/1962 | Ofner | |
| 3,523,451 A | 8/1970 | Kohn | |
| 3,611,803 A * | 10/1971 | Kajiura et al. | G01F 1/30 73/861.73 |
| 3,640,136 A * | 2/1972 | Nolte | G01F 1/30 73/861.73 |
| 3,724,720 A * | 4/1973 | Bullivant | B65G 47/00 222/55 |
| 3,878,103 A | 4/1975 | Miller et al. | |
| 3,939,709 A * | 2/1976 | Echtler | G01F 1/30 73/861.73 |
| 3,945,532 A | 3/1976 | Marks | |
| 4,067,238 A | 1/1978 | Oetiker | |
| 4,157,661 A | 6/1979 | Schindel | |
| 4,254,664 A | 3/1981 | Graham | |
| 4,397,423 A | 8/1983 | Beaver et al. | |
| 4,440,029 A * | 4/1984 | Tomiyasu | G01F 1/30 73/861.73 |
| 4,637,262 A | 1/1987 | Vesa | |
| 4,765,190 A * | 8/1988 | Strubbe | A01D 41/1271 222/71 |
| 4,788,930 A | 12/1988 | Matteau et al. | |

(Continued)

FOREIGN PATENT DOCUMENTS

WO  WO2010025526  3/2010

OTHER PUBLICATIONS

"FeedPro: A step up to better pork production through improved feed blending", Agtronix, Publisher: Pella Electronics Co. Inc., Pella, IA.

*Primary Examiner* — Jewel V Dowtin
(74) *Attorney, Agent, or Firm* — Davis, Brown, Koehn, Shors & Roberts, P.C.; Matthew Warner-Blankenship

(57) ABSTRACT

The disclosed apparatus, systems and methods relate to a flow meter for flowable material configured to be used in non-vertical orientations.

20 Claims, 4 Drawing Sheets

(56) References Cited

U.S. PATENT DOCUMENTS

| | | | |
|---|---|---|---|
| 5,065,632 A * | 11/1991 | Reuter | G01F 1/28 |
| | | | 73/861.73 |
| 5,118,410 A | 6/1992 | Rumberger | |
| 5,335,554 A | 8/1994 | Kempf et al. | |
| 5,343,761 A * | 9/1994 | Myers | A01C 7/105 |
| | | | 73/861 |
| 5,423,456 A | 6/1995 | Arendonk et al. | |
| 5,561,250 A | 10/1996 | Myers | |
| 5,798,466 A * | 8/1998 | Satake | G01F 1/30 |
| | | | 73/861.73 |
| 5,837,906 A * | 11/1998 | Palmer | A01D 41/1271 |
| | | | 73/861.73 |
| 5,895,865 A * | 4/1999 | Ozawa | G01F 1/206 |
| | | | 73/861.73 |
| 6,094,994 A * | 8/2000 | Satake | G01F 1/30 |
| | | | 222/55 |
| 6,805,014 B1 | 10/2004 | Shyy et al. | |
| 6,973,843 B2 * | 12/2005 | Shyy | G01F 1/30 |
| | | | 73/861.73 |
| 8,347,709 B2 * | 1/2013 | Kormann | A01D 41/1271 |
| | | | 73/272 R |

\* cited by examiner

DEVICES, SYSTEMS AND METHODS FOR MEASURING FLOW

CROSS-REFERENCE TO RELATED APPLICATIONS

This application claims priority to the U.S. Provisional Application No. 62/358,534 filed Sep. 9, 2016 and entitled "Devices, Systems and Methods for Measuring Flow" which is hereby incorporated by reference in its entirety under 35 U.S.C. § 119(e).

TECHNICAL FIELD

The disclosed technology relates generally to devices, systems and methods for monitoring the flow of particulate matter or powder, and in particular, in non-vertical applications.

BACKGROUND

The disclosure relates to apparatus, systems and methods for the measurement of particulate matter flow, particularly in non-vertical settings, including horizontal settings. Various applications also work in traditional vertical settings.

Bulk materials are often moved by gravity through inclined spouts. Real time, in-line and accurate flow measurement without interrupting flow in these inclined spouts present a tremendous technical challenge. Monitoring and managing material flow in real time for conditioning of grains or seeds, for example, can increase operating efficiency and can improve profitability.

Accurate flow measurement can result in improved process management and significant cost saving for companies handling high value products such as seeds and food grade materials, including powders, grain and feed handling, corn and soybean processing, popcorn, dry food ingredients, plastic pellets, and pharmaceuticals. Continuous monitoring of flow rates can also provide useful information for equipment adjustment or integrating with a process such as adding a chemical in seed treating or ingredients during food processing.

Currently, a number of flowmeters are available that measure flow of bulk materials. Some of these flow meters are "batch"-type, meaning that a sample or batch is periodically drawn from the flow and weighed to compute the flow. These "batch"-type flow meters have limited value since they are not real-time measurements. Others are "continuous batch"-type meters that load a specific amount of materials in a bin, weigh it and then unload to another bin. These also are not real-time, take significant space and are expensive.

Vertical flow meters that provide real-time data often require the vertical "falling" of the material, due to the gravity requirements. Considerable head space and remodeling of existing piping are needed to make the flow vertical which is expensive.

So, there is a need for a non-vertical, real-time and compact flow meter that can be installed without modifying the existing geometric configuration and measures the flow accurately in real time without interrupting the flow. In a non-vertical flow applications, the materials "slide" in the spout as opposed to the "falling" that occurs freely in vertical flow. Therefore, there is need in the art for devices, systems and methods to measure the flow in non-vertical applications.

BRIEF SUMMARY

Figure 1:
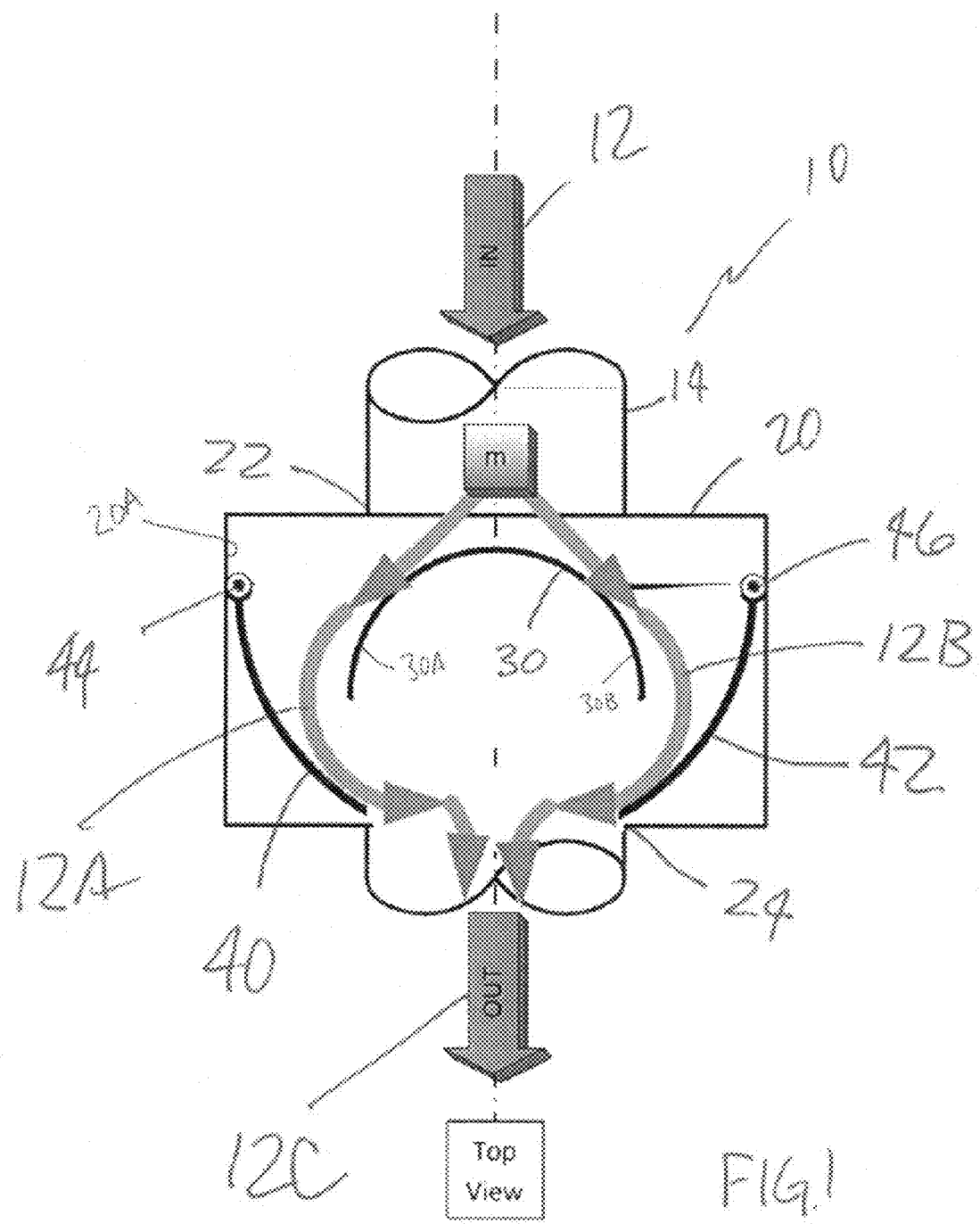
FIG. 1 is a cross-sectional front view of one implementation of the flow meter.

Discussed herein are various devices, systems and methods relating to a real-time flow meter capable of functioning in non-vertical and horizontal settings for measuring the flow of a particulate matter via pressure rather than impact.

A system of one or more computers or programmable logic controllers (PLC) can be configured to perform particular operations or actions by virtue of having software, firmware, hardware, or a combination of them installed on the system that in operation causes or cause the system to perform the actions. One or more computer or PLC programs can be configured to perform particular operations or actions by virtue of including instructions that, when executed by data processing apparatus, cause the apparatus to perform the actions. One general aspect includes a flow meter including: a chamber, and at least one sensing surface disposed within the chamber. Other embodiments of this aspect include corresponding computer or PLC systems, apparatus, and programs recorded on one or more computer or PLC storage devices, each configured to perform the actions of the methods.

Implementations may include one or more of the following features. The flow meter where the flow meter is configured to operate in non-vertical orientations. The flow meter further including a load cell in operational communication with the at least one sensing surface. The flow meter where the load cell is configured to record the pressure applied to the at least one sensing surface. The flow meter further including at least one pivot configured to allow the movement of the at least one sensing surface. The flow meter further including a guide disposed within the chamber. The flow meter further including a measurement device configured to measure flow rate. The flow meter where the sensing surfaces are disposed downstream of the guide within the lumen. The flow meter where the sensing surfaces are in operational communication with the load cell via pivots. The flow meter where the flow measurement chamber is configured to be disposed at a not vertical orientation when in use. The flow meter where the plurality of sensing surfaces are curved. The flow meter where the load cell is configured to respond to material pressure. The flow meter where the flow meter is configured to operate in non-vertical orientations. The flow meter where the flow meter is configured to operate in horizontal orientations. Implementations of the described techniques may include hardware, a method or process, or computer or PLC software on a computer-accessible medium.

One general aspect includes a flow meter including: a flow measurement chamber including a lumen, a guide disposed within the lumen, a plurality of sensing surfaces disposed within the lumen, and a load cell in operational communication with the plurality of sensing surfaces. Other embodiments of this aspect include corresponding computer or PLC systems, apparatus, and computer or PLC programs recorded on one or more computer storage devices, each configured to perform the actions of the methods.

Implementations may include one or more of the following features. The flow meter further including a measurement device configured to measure flow rate. The flow meter where the sensing surfaces are disposed downstream of the guide within the lumen. The flow meter where the sensing surfaces are in operational communication with the load cell via pivots. The flow meter where the flow measurement chamber is configured to be disposed at a not vertical orientation when in use. The flow meter where the plurality of sensing surfaces are curved. The flow meter where the load cell is configured to respond to material pressure. The flow meter where the flow meter is configured to operate in non-vertical orientations. The flow meter where the flow meter is configured to operate in horizontal orientations. Implementations of the described techniques may include hardware, a method or process, or computer software on a computer-accessible medium.

One general aspect includes a flow meter including: a flow measurement chamber including a lumen, a guide disposed within the lumen configured to separate the flow of a flowable material into several streams, a plurality of sensing surfaces disposed within the lumen via a plurality of pivots and configured to be urged downstream by pressure applied by the several streams, a load cell in operational communication with the plurality of sensing surfaces and configured to measure material flow pressure via the several streams pressure applied to the sensing surfaces. Other embodiments of this aspect include corresponding computer systems, apparatus, and computer programs recorded on one or more computer storage devices, each configured to perform the actions of the methods.

Implementations may include one or more of the following features. The flow meter where the flow meter is configured to operate in non-vertical orientations. The flow meter where the flow meter is configured to operate in horizontal orientations. Implementations of the described techniques may include hardware, a method or process, or computer software on a computer-accessible medium.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various embodiments disclosed or contemplated herein relate to a flow meter 10, namely a flow meter 10 that is configured to function in a variety of non-vertical orientations as well as traditional vertical implementations, like those described in U.S. Pat. No. 9,354,092, patented May 31, 2016 and entitled "In-Line Pressure-Based Flow Meter" and U.S. application Ser. No. 14/577,224, filed Dec. 19, 2014 and entitled "Flow Monitor and Regulator," both of which are incorporated herein in their entirety for all purposes.

As shown in FIG. 1, the various implementations of the flow meter 10 determine the real-time flowrate of a stream 12 of particulate materials moving in an pipe 14, such as a pipe 14 on an incline or other conduit without interrupting the flow or changing the existing configuration. As described herein, these implementations can be used in vertical, non-vertical or horizontal applications. In various implementations, such as horizontal or inclined implementations, a combination of gravity and/or other motive forces, such as pneumatic forces, the application of vacuums, or conveyor belts can be used to move particulate matter through the flow meter 10, as would be appreciated by one of skill in the art. It will be appreciated that in certain implementations, the material may also be flowing in a direction opposite of the force of gravity, so as to flow upwards.

In these implementations, the flow meter 10 comprises a flow measurement chamber 20 having inlet 22 and outlet 24 ends configured or otherwise constructed and arranged to allow a material stream 12 to pass through the chamber 20. In various implementations, the material stream is particulate, such as a crop, seed or powders such as pharmaceuticals, as would be understood.

In the implementation of FIG. 1, the chamber 20 is generally rectangularly cylindrical with a lumen 20A within, but in alternate embodiments can be otherwise shaped, with the inlet end 22 configured to couple to an existing pipe to bring the stream 12 to the chamber 20 and an outlet end 24 matching to the existing exit configuration for the materials to flow out of the chamber 20.

As shown in FIGS. 1-4, in the lumen 20A, according to these implementations, a guide 30 is disposed upstream within the lumen 20A and configured to divide and move the material stream 12 around the sides 30A, 30B of the guide 30. In certain implementations, and as shown in FIG. 1, the guide 30 is shaped like a half-cylinder, but alternate shapes such as a wedge or other known configuration can also be used.

In use, the material 12A, 12B flows into at least one downstream sensing surface 40, 42 which attached the chamber 20 via at least one pivot 44, 46. In various implementations, the one or more sensing surfaces 40, 42 can be curved, hemispheric, substantially planar or any of many other forms capable of being urged downstream in response to the pressure applied by the flowing material 12. In various implementations, the pivot or pivots 44, 46 can be operationally integrated with springs (not shown) or other devices configured to urge the sensing surfaces 40, 46 into a defined position in the absence of any flowable material 12.

As described herein, the measurement of the various streams of material 12A, 12B pressure flowing over the guide 30 is made via the downstream mounted sensing surfaces 40, 42 via the pressure applied to those surfaces 40, 42. In these implementations, the materials 12A, 12B flowing over the sensing surfaces 40, 42 are subsequently combined 12C to exit the flow measurement chamber 20 through the outlet 24 without interrupting the flow of the material 12. It is understood that in certain implementations, the shape—such as curvature—of the sensing surfaces can facilitate the movement of the material 12 in the direction of the outlet 24. It is understood that in various implementations, the flow of material 12 through the chamber 20 in these implementations, the sensing surface or surfaces 40, 42 are urged downstream in response to the pressure applied by the streams 12A, 12B of flowable material 12.

Figure 2:
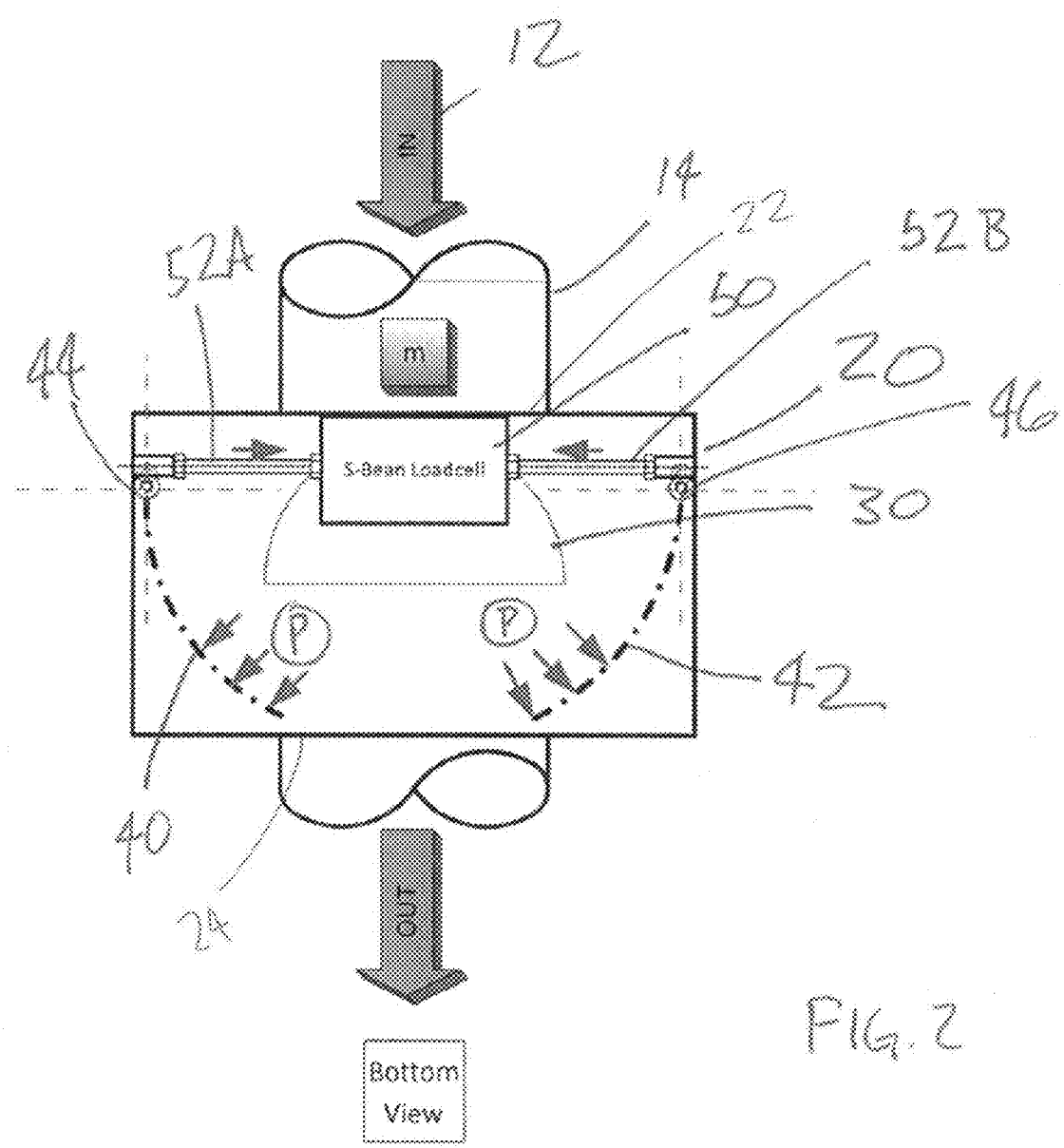
FIG. 2 is a cross-sectional front view of another implementation of the flow meter.

As shown in FIG. 2, in these implementations, the pivots 44, 46 are operationally connected to a load cell 50—such as an S-Bean load cell 50—via a linkage assembly 52A, 52B with a damper to reduce any vibrations and/or shocks. In these implementations, the load cell 50 is therefore mechanically coupled with the pivoting sensing surfaces 40, 42 so as to be able to measure movement of the sensing surfaces 40, 42 and generate an electrical output signal proportional to the force and/or pressure applied (designated by reference arrows P) to the sensing surfaces 40, 42 by the flowing material 12A, 12B.

Figure 3:
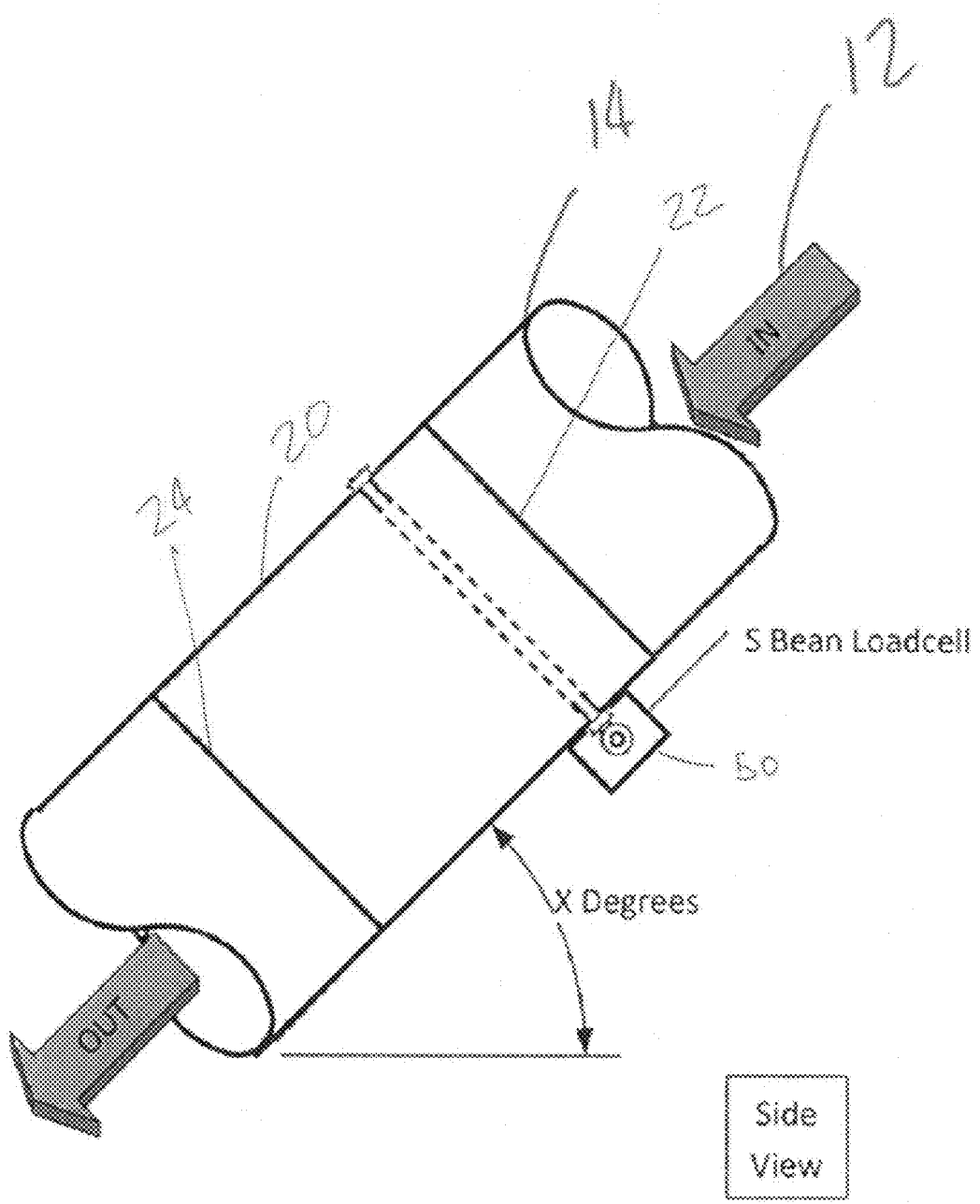
FIG. 3 is a side view of another implementation of the flow meter at a non-vertical angle.
Figure 4:
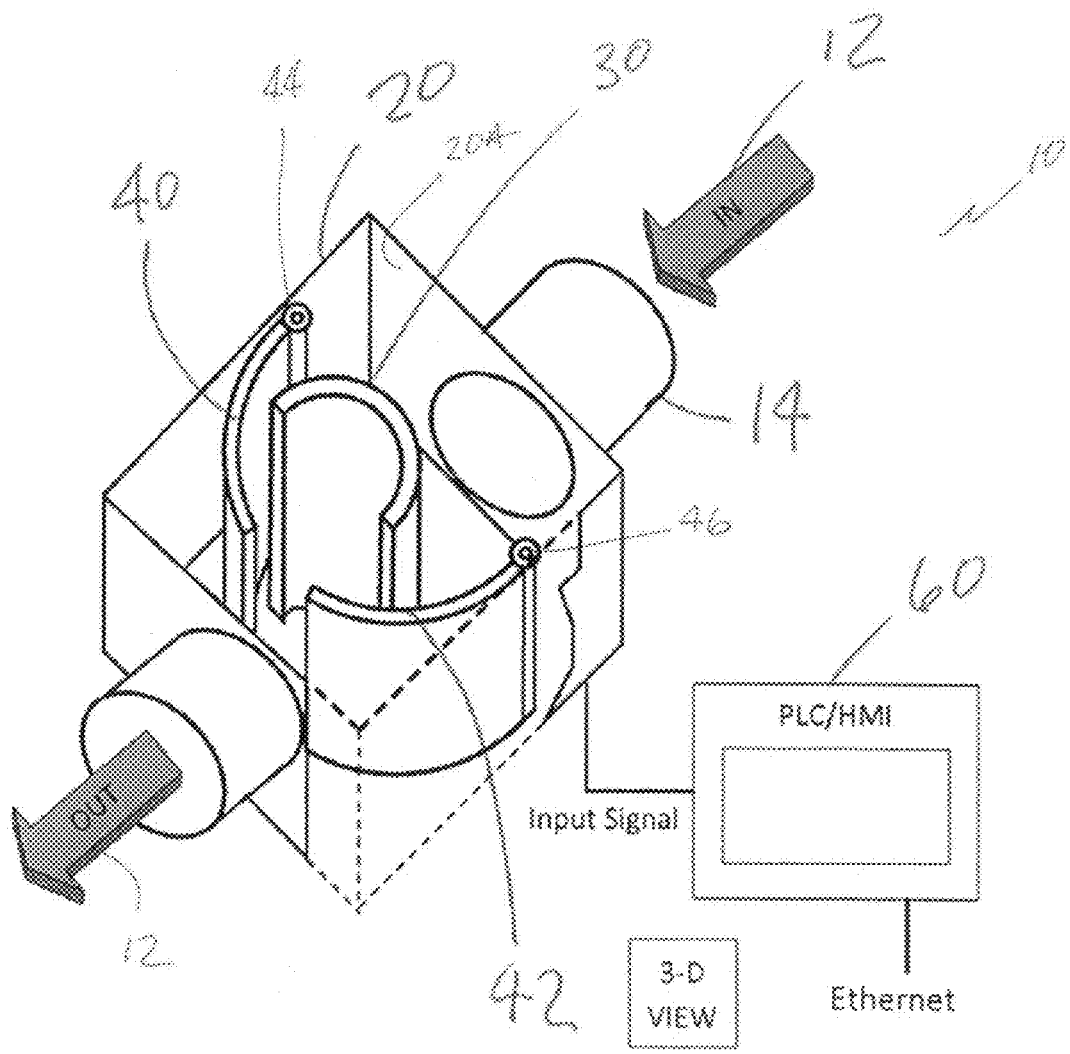
FIG. 4 is a cross-sectional perspective view of another implementation of the flow meter at a non-vertical angle.

It is therefore understood that this output signal is proportional to the mass flow rate of the materials 12A, 12B, regardless of the orientation of the chamber 20, as is shown in FIG. 3. In various implementations the force and/or pressure applied by the flowing streams 12A, 12B on curved sensing surfaces 40, 42 can be amplified by controlling the cantilever leveraging action of the curved sensing surfaces 40, 42, as would be understood by one of skill in the art. Because there are a plurality of sensing surfaces, and the flow rate is determined by the aggregate force on the plurality of sensing surfaces 40, 42, the portion of material 12 encountering each individual sensing surface 40, 42 is generally irrelevant.

In various implementations, a measurement device 60 is also provided, such as a computer having an operations system, processor and memory or a PLC/HMI or other similar device known in the art and capable of processing and analyzing data. In various implementations, software can be provided and used on the measurement device to process and convert the signals from each of the sensing surfaces 40, 42 to weight measurements, which can be combined to give a total flow rate. In certain implementations, the measurement device can be connected to the internet, such as via an ethernet connection, and can also be in electronic communication with any number of known components, such as a display, a database, controls and the like.

It is understood that the combination of these measurements therefore allows the meter 10 to operate and various non-vertical angles, as the rate of flow over each of the sensing surfaces 40, 42 need not be equal to calculate an accurate, real-time flow rate. The total weight of materials for any given period can be calculated by summing the pressure applied to the sensing surfaces 40, 42 in the real time. It is understood that various corrections or other calculations can be used to establish the correlation between the pressure applied to each of the sensing surfaces 40, 42 and the actual flow rate of the material.

Although the disclosure has been described with reference to preferred embodiments, persons skilled in the art will recognize that changes may be made in form and detail without departing from the spirit and scope of the disclosed apparatus, systems and methods.

What is claimed is:

1. A non-vertical flow meter comprising:
   a) a chamber defining a lumen, the chamber disposed at a non-vertical flow angle;
   b) at least one pivoting sensing surface disposed within the lumen; and
   c) a load cell in operational communication with the at least one pivoting sensing surface,
   wherein the load cell is constructed and arranged to record the pressure of a flowing material applied to the at least one sensing surface.

2. The flow meter of claim 1, further comprising at least one pivot configured to allow the movement of the at least one sensing surface.

3. The flow meter of claim 2, wherein the pivot further comprises a spring.

4. The flow meter of claim 3, wherein the load cell is mechanically coupled to the at least one pivot.

5. The flow meter of claim 4, wherein the load cell generates an electrical output signal proportional to the force applied to the at least one pivoting sensing surface.

6. A flow meter comprising:
   a) a flow measurement chamber comprising a lumen;
   b) a guide disposed within the lumen;
   c) one or more pivoting sensing surfaces disposed within the lumen; and
   d) a load cell in operational communication with the one or more pivoting sensing surfaces,
   wherein the entire flow measurement chamber is constructed and arranged to be disposed at a non-vertical orientation when in use, and
   wherein the load cell is constructed and arranged to generate an electrical output signal proportional to the pressure of a flowable material applied to the one or more pivoting sensing surfaces.

7. The flow meter of claim 6, further comprising a measurement device configured to measure flow rate and the weight of accumulated flow.

8. The flow meter of claim 6, wherein the one or more pivoting sensing surfaces are disposed downstream of the guide within the lumen.

9. The flow meter of claim 8, wherein the one or more pivoting sensing surfaces are in operational communication with the load cell via pivots.

10. The flow meter of claim 6, wherein the one or more pivoting sensing surfaces are curved in the direction of flow.

11. The flow meter of claim 6, wherein the load cell is constructed and arranged to calculate the flow rate via an aggregate pressure applied to the one or more pivoting sensing surfaces.

12. A flow meter comprising:
    a) a flow measurement chamber comprising a lumen having inlet and outlet ends;
    b) a guide fixedly disposed within the lumen configured to separate the flow of a flowable material into several streams;
    c) a plurality of sensing surfaces disposed within the lumen via a plurality of pivots and configured to be urged downstream by pressure applied to one or more of the plurality of sensing surfaces by the several streams; and
    d) a load cell in operational communication with the plurality of sensing surfaces and configured to measure material flow pressure via the several streams pressure applied to the sensing surfaces,
    wherein the flow meter is disposed such that the inlet and outlet ends of the lumen define a non-vertical axis for material flow.

13. The flow meter of claim 12, wherein the flow meter is configured to operate in horizontal orientations, such that the inlet and outlet ends of the lumen are disposed substantially horizontally from one another.

14. The flow meter of claim 12, wherein the flow meter is configured such that the material flows horizontally.

15. The flow meter of claim 12, wherein the flow meter is configured such that the material flows opposite gravity.

16. A flow meter comprising:
    a) a flow measurement chamber comprising a lumen, an inlet and an outlet;
    b) a guide disposed within the lumen configured to separate the flow of a flowable material into one or more streams;
    c) one or more sensing surfaces disposed within the lumen via a plurality of pivots and configured to be urged downstream by pressure applied by the one or more streams; and
    d) a load cell in operational communication with the one or more sensing surfaces and configured to measure material flow pressure via the several streams pressure applied to the sensing surfaces,
    wherein:

i) the material is moved through the lumen via pneumatic conveyor, and ii) the load cell is constructed and arranged to calculate flow rate via aggregate pressure applied to the one or more sensing surfaces.

17. The flow meter of claim 16, wherein the flow meter is configured to operate in non-vertical orientations.

18. The flow meter of claim 16, wherein the plurality of pivots further comprise springs.

19. A flow meter comprising:

a) a flow measurement chamber comprising a lumen;

b) a guide disposed within the lumen configured to separate the flow of a flowable material into several streams;

c) a plurality of sensing surfaces disposed within the lumen via a plurality of pivots and configured to be urged downstream by pressure applied by the several streams; and d) a load cell in operational communication with the plurality of sensing surfaces and configured to measure material flow pressure via the several streams pressure applied to the sensing surfaces, wherein the flow meter is configured to measure at least one of flow rate and accumulated flow.

20. The flow meter of claim 19, wherein the flow meter is configured to operate in non-vertical orientations.

* * * * *